US012769110B2

(12) United States Patent
Raub

(10) Patent No.: US 12,769,110 B2
(45) Date of Patent: Oct. 20, 2026

(54) PORTABLE SELF-ADHERING OPTICAL LENS

(71) Applicant: Kimberly Ann Raub, Independence, KY (US)

(72) Inventor: Kimberly Ann Raub, Independence, KY (US)

( * ) Notice: Subject to any disclaimer, the term of this patent is extended or adjusted under 35 U.S.C. 154(b) by 1162 days.

(21) Appl. No.: 17/549,430

(22) Filed: Dec. 13, 2021

(65) Prior Publication Data

US 2022/0187589 A1 Jun. 16, 2022

Related U.S. Application Data

(60) Provisional application No. 63/124,631, filed on Dec. 11, 2020.

(51) Int. Cl.
*G02B 25/00* (2006.01)
*G02B 5/08* (2006.01)
*G02B 7/182* (2021.01)

(52) U.S. Cl.
CPC ............ *G02B 25/007* (2013.01); *G02B 5/08* (2013.01); *G02B 7/182* (2013.01)

(58) Field of Classification Search
CPC . G02B 3/02; G02B 5/007; G02B 5/08; G02B 7/182; G02B 7/02; G02B 25/002; G02B 2003/0093
USPC .......................................................... 359/642
See application file for complete search history.

(56) References Cited

U.S. PATENT DOCUMENTS 2,532,877 A * 12/1950 Auer .................... G02B 25/002 359/812
4,709,657 A * 12/1987 Gothard ............... A01K 63/006 D16/136
4,838,674 A * 6/1989 Dufour .................. G02C 7/061 351/159.42
7,562,980 B2 7/2009 Rymniak
7,813,060 B1 10/2010 Bright et al.
8,905,560 B1 * 12/2014 Zadro .................... A45D 42/14 248/467
9,810,882 B2 * 11/2017 Chen ........................ G02B 9/64
2009/0251662 A1 10/2009 Rymniak

* cited by examiner

*Primary Examiner* — Thomas K Pham
*Assistant Examiner* — Justin W. Hustoft
(74) *Attorney, Agent, or Firm* — HG LAW LLP

(57) ABSTRACT

An optical lens for magnifying a reflection in a mirror is disclosed herein. The optical lens comprises a conical concave surface located on a first side of the optical lens and a conical convex surface located on a second side of the optical lens opposite the first side. An optical axis of the optical lens is formed along a central portion of the conical concave surface and a central portion of the conical convex surface. The conical concave surface has a first radius of curvature and the conical convex surface has a second radius of curvature greater in magnitude than the first radius of curvature. At least a portion of the conical concave surface is self-adherable to a mirror. When at least the portion of the conical concave surface is self-adhered to the mirror, the optical lens is configured to magnify mirror images viewed through the optical lens and the mirror.

20 Claims, 5 Drawing Sheets

PORTABLE SELF-ADHERING OPTICAL LENS

CROSS-REFERENCE TO RELATED APPLICATION

The present application claims the benefit under 35 U.S.C. § 119(e) of U.S. Provisional Patent Application No. 63/124,631, filed on Dec. 11, 2020, which is hereby incorporated by reference herein in its entirety.

INTRODUCTION

The present disclosure relates to a portable self-adhering optical lens and, more particularly, to a lens that is portable and adherable to a mirror for improving visibility by magnifying a reflection in the mirror while a user is applying cosmetics and/or tending to their eye or another portion of their face.

SUMMARY

For a variety of reasons, such as aging or diseased eyes, some people have difficulty clearly seeing objects or images located relatively near to their eyes and require some type of reading lens to see clearly. One approach for addressing this issue is to wear reading glasses. This approach, however, has drawbacks. One cannot easily wear reading glasses while tending to their face or eyes because the glasses obstruct the area over and near the eyes and ears and thus interfere with the application of eye makeup, the trimming of eyebrows, the insertion or removal of contact lenses, facial hair shaving, or any other type of tending to the region of the face in and around the eyes and ears. Another approach for addressing the above-identified issue is to utilize a makeup mirror. This approach also suffers from drawbacks, as makeup mirrors tend to be bulky, not travel friendly, and often require batteries or another electrical power source to properly function.

The present disclosure provides an optical lens configured to adhere to a mirror and magnify a reflection in the mirror. According to one example, the optical lens comprises a conical concave surface located on a first side of the optical lens and a conical convex surface located on a second side of the optical lens opposite the first side. An optical axis of the optical lens is formed along a central portion of the conical concave surface and a central portion of the conical convex surface. The conical concave surface has a first radius of curvature and the conical convex surface has a second radius of curvature greater in magnitude than the first radius of curvature. At least a portion of the conical concave surface is self-adherable to a mirror. When at least the portion of the conical concave surface is self-adhered to the mirror, the optical lens is configured to magnify mirror images viewed through the optical lens and the mirror.

In some examples, at least the portion of the conical concave surface is formed of micro-suction material configured to self-adhere to the mirror.

In other examples, the optical lens is formed of optical grade plastic material, high refractive index material, high-plastic material, or polycarbonate material.

The optical lens, in another aspect, is formed of pliable suction cup material configured to enable at least the portion of the conical concave surface to self-adhere to the mirror.

In yet another aspect, when at least the portion of the conical concave surface is self-adhered to the mirror, at least the portion of the conical concave surface self-adheres substantially flush to the mirror with an air gap located in between the mirror and the central portion of the conical concave surface.

In one aspect, the optical lens further includes a beveled edge adjoining perimeters of the conical concave surface and the conical convex surface.

In a further example, the first radius of curvature and the second radius of curvature are configured to yield an optical power for the optical lens in a range from 0.25 to 3 diopters.

In some examples, the optical lens further includes a frame positioned around perimeters of the conical concave surface and the conical convex surface, the frame being formed of material different from a material of which the conical concave surface and conical convex surface are formed.

In other examples, the conical concave surface has a first conical constant and the conical convex surface has a second conical constant greater in magnitude than the first conical constant.

In yet another aspect, a shape of the optical lens viewed along the optical axis is circular, oval, rectangular, or square.

In accordance with another aspect of the disclosure, an apparatus for magnifying a reflection in a mirror is provided. The apparatus includes an optical lens and an adhesive material. The optical lens includes a conical concave surface located on a first side of the optical lens, and a conical convex surface located on a second side of the optical lens opposite the first side. An optical axis of the optical lens is formed along a central portion of the conical concave surface and a central portion of the conical convex surface. The conical concave surface has a first radius of curvature and the conical convex surface has a second radius of curvature greater in magnitude than the first radius of curvature. The adhesive material is affixed to at least a portion of the conical concave surface causing at least the portion of the conical concave surface to be self-adherable to a mirror. When at least the portion of the conical concave surface is self-adhered to the mirror, the optical lens is configured to magnify mirror images viewed through the optical lens and the mirror.

In some examples, the adhesive material includes micro-suction material configured to self-adhere to the mirror, the micro-suction material being different from a material of which the optical lens is formed.

In another example, the micro-suction material is affixed to an outer portion of the conical concave surface and the central portion of the conical concave surface lacks the micro-suction material.

The optical lens, in a further aspect, is formed of optical grade plastic material, high refractive index material, high-plastic material, or polycarbonate material.

In yet another aspect, when at least the portion of the conical concave surface is self-adhered to the mirror, at least the portion of the conical concave surface self-adheres substantially flush to the mirror with an air gap located in between the mirror and the central portion of the conical concave surface.

In a further example, the optical lens further includes a beveled edge adjoining perimeters of the conical concave surface and the conical convex surface.

The first radius of curvature and the second radius of curvature, in another aspect, are configured to yield an optical power for the optical lens in a range from 0.25 to 3 diopters.

In some examples, the apparatus further includes a frame positioned around a perimeter of the optical lens, the frame being formed of material different from a material of which the optical lens is formed.

The conical concave surface has a first conical constant and the conical convex surface has a second conical constant greater in magnitude than the first conical constant, in one aspect.

A shape of the optical lens viewed along the optical axis may be, for example, circular, oval, rectangular, or square.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In order to address the above-noted and other shortcomings, the present disclosure provides various pliable, self-adhering reading lenses, which may have optical powers in a range from 0.25 to 3.00 diopters, for example, and are adherable to any suitable mirror, and assist in the application of makeup, tweezing of eyebrows, contact lens application, facial hair shaving, removal of ear hair, nose hair, administration of eye drops/medication, and/or the like. The lenses described herein may be formed of, by way of example without limitation, optical grade plastic CR-39, Trivex®, high index 1.74/1.67, high-plastic, and/or polycarbonate materials, optionally having an anti-scratch coating. The lenses described herein overcome the above-noted and other shortcomings at least by being pliable, easily portable, conveniently adherable to any mirror, and operable without requiring battery or other electrical power. The rear portion of the lens is self-adhesive, for instance, by including a self-adhesive material such as a micro-suction adhesive material. The lenses may be of various sizes, shapes (e.g., rectangular, oval, round, or square or any combination thereof), and styles. The lenses in some aspects, may be borderless or may include a border formed of any suitable material (e.g., rigid plastic) that frames the lens.

Figure 1:
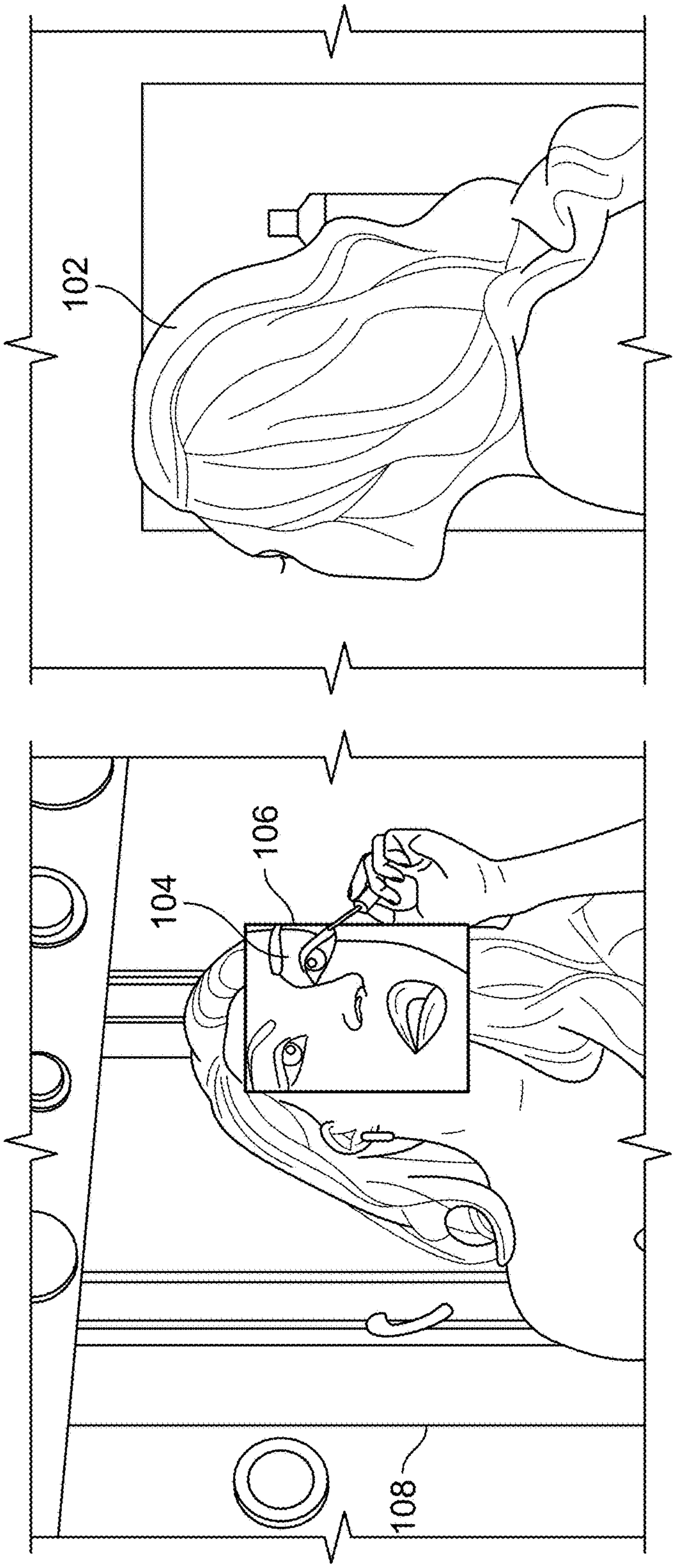
FIG. 1 shows an illustrative scenario in which a user views a magnified portion of their face by way of a portable self-adhering optical lens adhered to a mirror, in accordance with some embodiments of the disclosure.

FIG. 1 shows an illustrative scenario 100 (not drawn to scale) in which a user 102 views a magnified portion 104 of a reflection of their face by way of a portable self-adhering optical lens 106 adhered to a mirror 108, in accordance with some embodiments of the disclosure. Although optical lens 106 shown in FIG. 1 has a rectangular shape, as described elsewhere herein, the various optical lenses herein may alternatively have shapes other than rectangular. As can be seen in FIG. 1, user 102 is able to apply eye makeup while viewing the magnified portion 104 of their reflected face including their eyes via the optical lens 106 adhered to the mirror 108, without the need for eyeglasses that would interfere with the application of the eye makeup.

Figure 2:
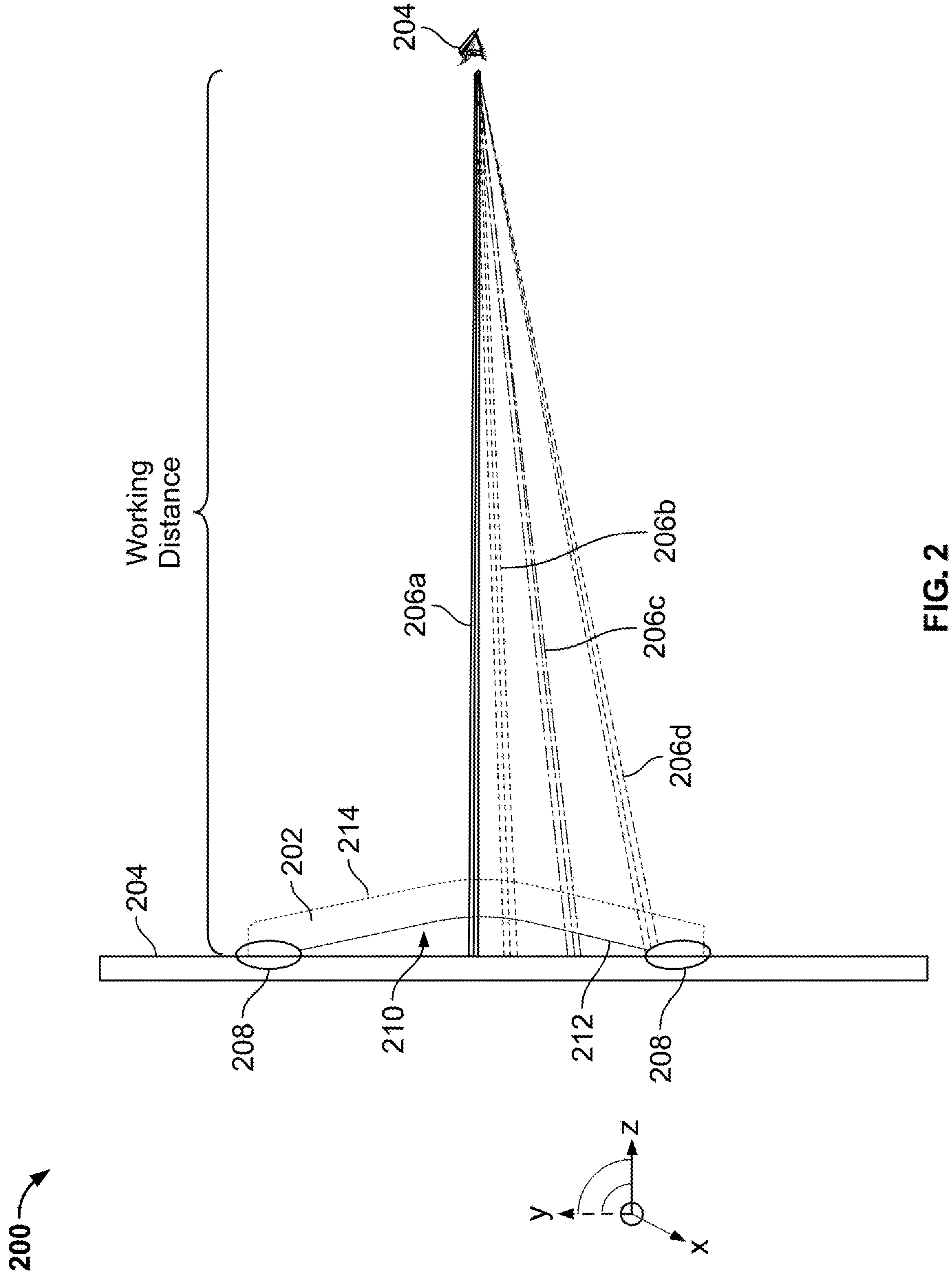
FIG. 2 is an illustrative diagram showing a portable self-adhering optical lens adhered to a mirror, in accordance with some embodiments of the disclosure.

FIG. 2 is an illustrative diagram 200 showing a portable self-adhering optical lens 202 adhered to a mirror 204, in accordance with some embodiments of the disclosure. In one example, the optical power of optical lens 202 is approximately 1.25 diopters, and the working distance between the user's eye 204 and a conical convex surface 214 of optical lens 202 is approximately 35 cm. Light reflected from mirror 204 is refracted through optical lens 202 and directed toward eye 204 via various light paths 206*a*, 206*b*, 206*c*, and 206*d* to provide a magnification effect upon the user's reflection in mirror 204. An optical axis of optical lens 202, in this example, is aligned with a central portion of optical lens 202 and eye 204 and coincides with light path 206*a* and axis Z. In one example, when at least a portion 208 of conical concave surface 212 of optical lens 202 is self-adhered to mirror 204, at least the portion 208 of conical concave surface 212 self-adheres substantially flush to mirror 204 with an air gap 210 located in between mirror 204 and a central portion of conical concave surface 212 of optical lens 202.

Figure 3:
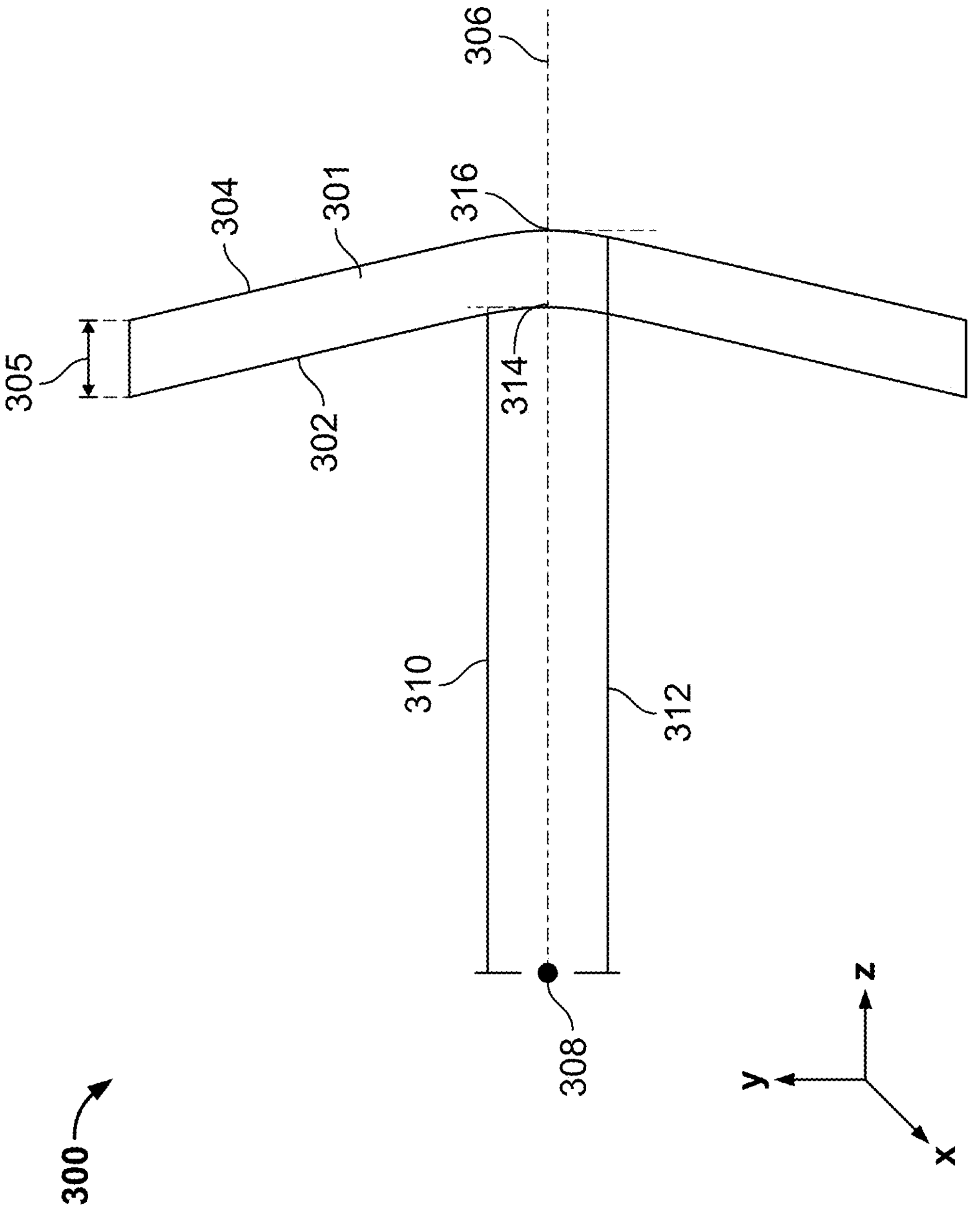
FIG. 3 is an illustrative diagram showing various aspects of a portable self-adhering optical lens, in accordance with some embodiments of the disclosure.

FIG. 3 is an illustrative diagram 300 showing various aspects of a portable self-adhering optical lens 301 for magnifying a reflection in a mirror, in accordance with some embodiments of the disclosure. Optical lens 301 includes conical concave surface 302 located on a first side of optical lens 301 and conical convex surface 304 located on a second side of optical lens 301 opposite the first side. Optical lens 301, in various aspects, may be formed of optical grade plastic material, high refractive index material, Trivex® material, high-plastic material, and/or polycarbonate material. Optical axis 306 of optical lens 301 is formed along a central portion of conical concave surface 302 and a central portion of conical convex surface 304. Conical concave surface 302 has a first radius of curvature 310 relative to center of curvature 308 located along optical axis 306. Conical convex surface 304 has a second radius of curvature 312 relative to center of curvature 308 located along optical axis 306, with the second radius of curvature 312 being greater in magnitude than the first radius of curvature 310. The first radius of curvature and the second radius of curvature, in some aspects, are configured to yield an optical power for optical lens 301 in a range from 0.25 to 3 diopters. Conical concave surface 302 has a first conical constant and conical convex surface 304 has a second conical constant greater in magnitude than the first conical constant. In some examples, equation (1) below can be used to determine z(r), which represents the z-component of the displacement of a surface from a vertex of optical lens 301 (e.g., displacement from conical concave surface 302 to vertex 314 or displacement from conical convex surface 304 to vertex 316), at radial distance r from optical axis 306:

$$z(r) = \frac{cr^2}{1 + \sqrt{1 - (1 + k)c^2 r^2}}, \tag{1}$$

where c represents the curvature (the reciprocal of the radius), r represents the radial coordinate in mm, and k represents the conic constant. Table (1) below provides an illustrative set of values of radiuses, conic constants (k), and curvatures (c) for conical concave surface 302 and conical convex surface 304 in accordance with an example embodiment herein.

TABLE 1

| | Radius (mm) | Conic Constant k | Curvature c ($mm^{-1}$) |
|---|---|---|---|
| Conical Convex Surface 302 | −16.50164882169806 | −18.97054556386140 | −0.0606000049331 |
| Conical Concave Surface 304 | −22.12357729651631 | −20.08961621881482 | −0.0452006466494 |

At least a portion of conical concave surface 302 is self-adherable to a mirror (not shown in FIG. 3). In some examples, optical lens 301 is formed of pliable suction cup material configured to enable at least the portion of conical concave surface 302 to self-adhere to the mirror. When at least the portion of conical concave surface 302 is self-adhered to the mirror, optical lens 301 is configured to magnify mirror images viewed through optical lens 301 and the mirror. An edge 305 of optical lens 301 adjoins perimeters of conical concave surface 302 and conical convex surface 304 and, in one example, may be approximately 17 mm thick. In another aspect, edge 305 may be beveled (e.g., at approximately 45 degrees to a bevel face width of approximately 25 mm). For ease of portability, optical lens 301 is easily detachable from the mirror by applying manual force. All the dimensions herein may be specified and/or subject to suitable tolerances.

Figure 4:
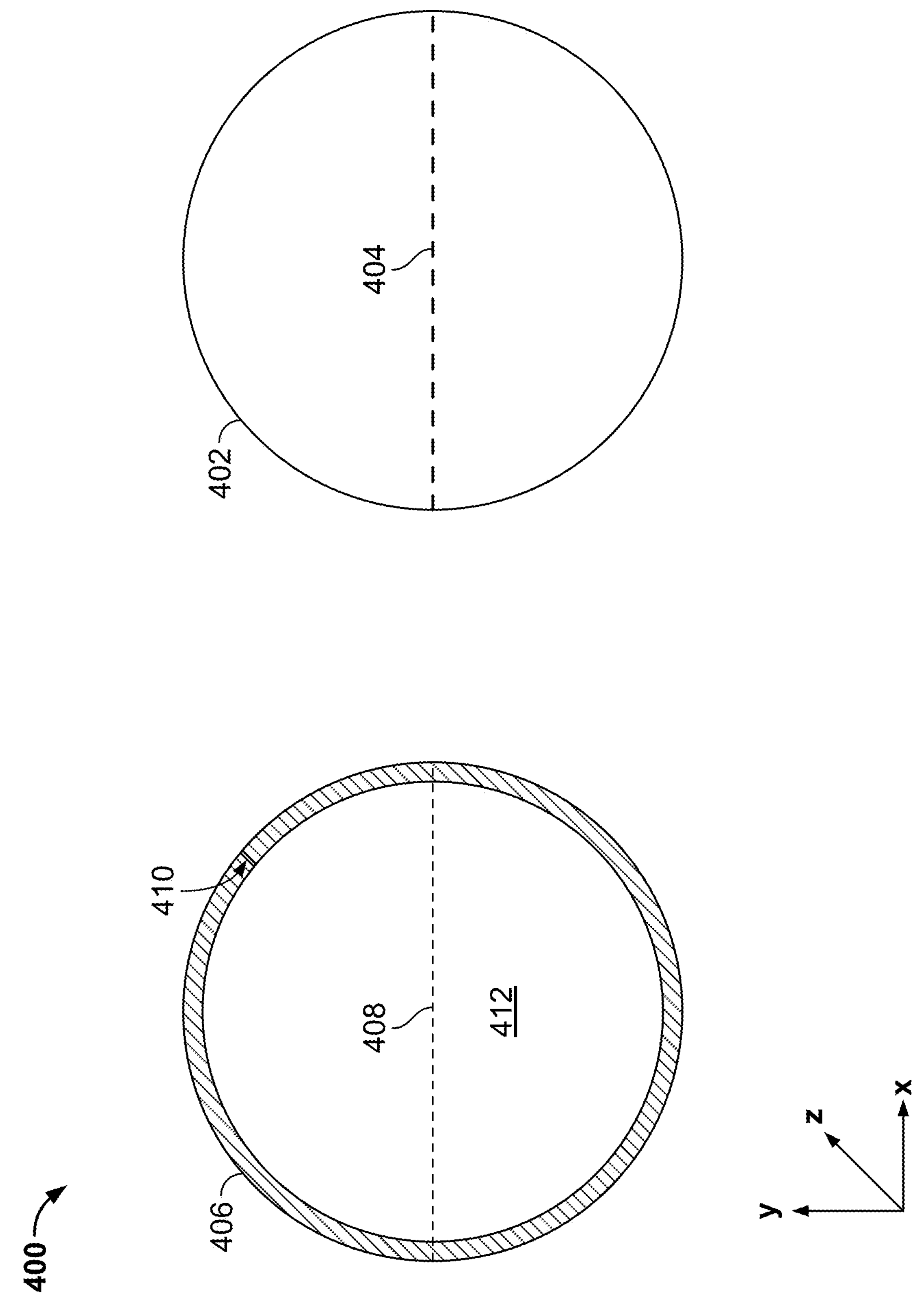
FIG. 4 is an illustrative diagram showing additional aspects of various portable self-adhering optical lenses, in accordance with some embodiments of the disclosure.

FIG. 4 is an illustrative diagram 400 showing views of various portable self-adhering optical lenses 402 and 406 when viewed from a negative z-axis, in accordance with some embodiments of the disclosure. Optical lens 402 and/or optical lens 406, in some examples, may further represent optical lens 301 described above. Optical lens 402 is circular in shape and has a diameter 404, which, in some examples, may be approximately 190 to 200 mm.

In one example, at least a portion 410 of conical concave surface 412 of optical lens 406 is formed of an adhesive material, which may be micro-suction material configured to self-adhere to a mirror (not shown in FIG. 4). In another example, an adhesive material is affixed to at least the portion 410 of conical concave surface 412, causing at least the portion of conical concave surface 412 to be self-adherable to a mirror (not shown in FIG. 4). When at least the portion of conical concave surface 412 is self-adhered to the mirror, optical lens 406 is configured to magnify mirror images viewed through optical lens 406 and the mirror. The micro-suction material, in some examples, may be different from a material of which the remaining portion of optical lens 406 is formed. The micro-suction material, in one example, is affixed to an outer portion 410 of conical concave surface 412 and central portion 408 of conical concave surface 412 lacks the micro-suction material, so as not to obstruct the passage of light through the central portion of optical lens 406.

Figure 5:
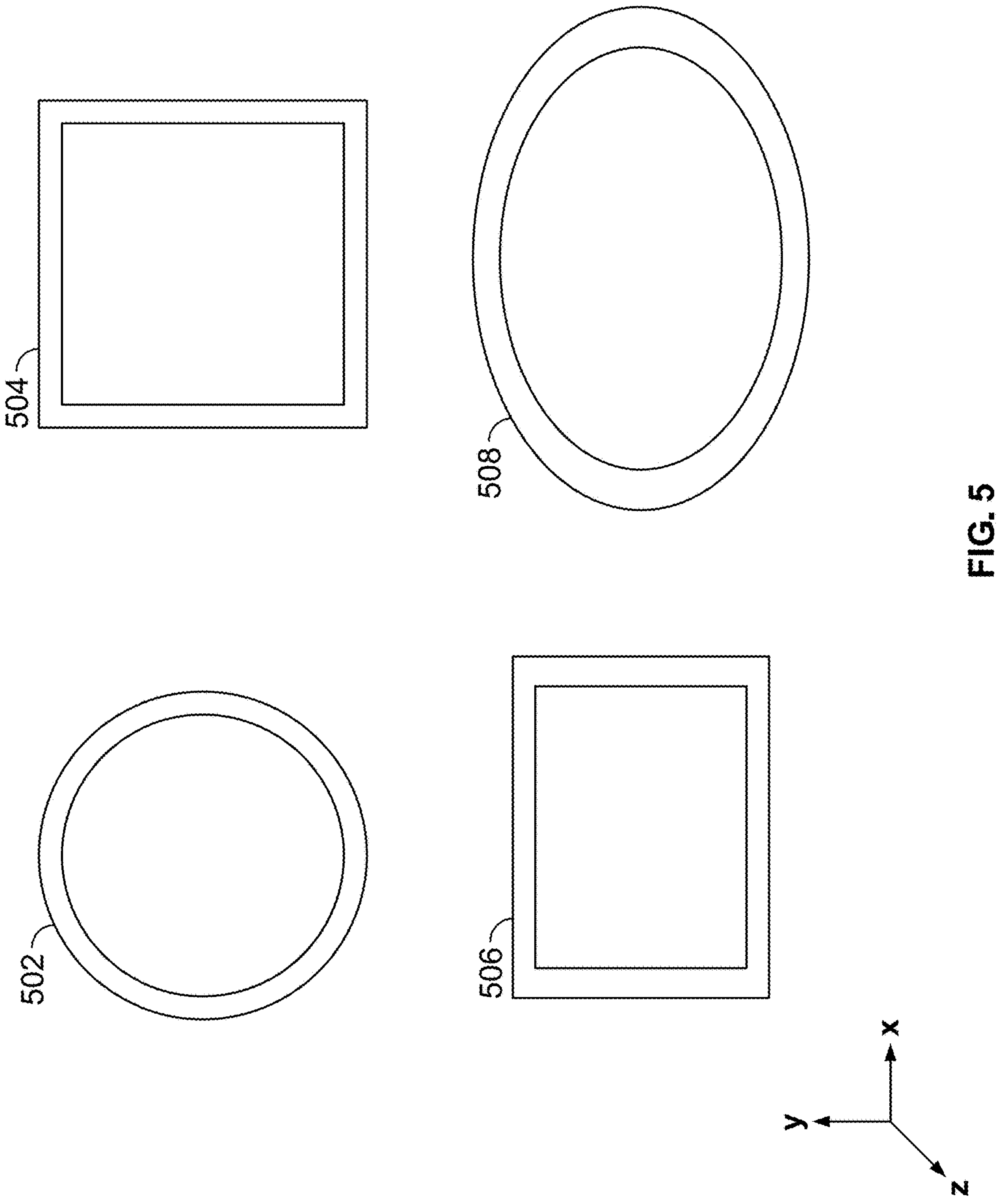
FIG. 5 is an illustrative diagram showing example shapes of various portable self-adhering optical lenses and frames, in accordance with some embodiments of the disclosure.

FIG. 5 is an illustrative diagram showing example shapes of various portable self-adhering optical lenses, in accordance with some embodiments of the disclosure. In some examples, the various optical lenses herein may further include a frame positioned around perimeters of the conical concave surface and the conical convex surface for ease of handling and removal of optical lens from mirror surfaces. The frame may be formed of material different from a material of which other portions of the optical lens (e.g., the conical concave surface and conical convex surface) are formed. A shape of the optical lens viewed along the optical (z) axis may be, for instance, circular (502), oval (508), rectangular (506), or square (504). A shape of the optical lens may have a variety of sizes, such as an 8-inch×10-inch rectangle, a 10-inch round circle, a 10-inch×9-inch oval, or a 10-inch square.

The apparatuses and optical lenses discussed above are intended to be illustrative and not limiting. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

What is claimed is:

1. An optical lens for magnifying a reflection in a mirror, the optical lens comprising:

a conical concave surface located on a first side of the optical lens; and a conical convex surface located on a second side of the optical lens opposite the first side, an optical axis of the optical lens being formed along a central portion of the conical concave surface and a central portion of the conical convex surface, the conical concave surface having a first radius of curvature and the conical convex surface having a second radius of curvature greater in magnitude than the first radius of curvature, and an annular adhesive film disposed on at least an outer annular portion of the conical concave surface and the central portion of the conical concave surface is free of adhesive, wherein, when at least the outer annular portion of the conical concave surface is self-adhered to the mirror, light passes through the central portion of the conical concave surface unobstructed by any self-adherable material, and the optical lens is configured to magnify mirror images viewed through the optical lens and the mirror.

2. The optical lens of claim 1, wherein at least the outer annular portion of the conical concave surface is formed of suction material configured to self-adhere to the mirror.

3. The optical lens of claim 1, wherein the optical lens is formed of at least one of optical grade plastic material, high refractive index material, high-plastic material, or polycarbonate material.

4. The optical lens of claim 1, wherein the optical lens is formed of pliable suction cup material configured to enable at least the outer annular portion of the conical concave surface to self-adhere to the mirror.

5. The optical lens of claim 1, wherein, when at least the outer annular portion of the conical concave surface is self-adhered to the mirror, at least the outer annular portion of the conical concave surface self-adheres flush to the mirror with an air gap located in between the mirror and the central portion of the conical concave surface.

6. The optical lens of claim 1, further comprising a beveled edge adjoining perimeters of the conical concave surface and the conical convex surface.

7. The optical lens of claim 1, wherein the first radius of curvature and the second radius of curvature are configured to yield an optical power for the optical lens in a range from 0.25 to 3 diopters.

8. The optical lens of claim 1, further comprising a frame positioned around perimeters of the conical concave surface and the conical convex surface, the frame being formed of material different from a material of which the conical concave surface and the conical convex surface are formed.

9. An apparatus for magnifying a reflection in a mirror, the apparatus comprising:
- an optical lens comprising:
  - a conical concave surface located on a first side of the optical lens, and
  - a conical convex surface located on a second side of the optical lens opposite the first side,
  - an optical axis of the optical lens being formed along a central portion of the conical concave surface and a central portion of the conical convex surface,
  - the conical concave surface having a first radius of curvature and the conical convex surface having a second radius of curvature greater in magnitude than the first radius of curvature; and
- an annular adhesive material affixed to at least an outer annular portion of the conical concave surface and the central portion of the conical concave surface is free of adhesive causing at least the outer annular portion of the conical concave surface to be self-adherable to the mirror, wherein, when at least the outer annular portion of the conical concave surface is self-adhered to the mirror, light passes through the central portion of the conical concave surface unobstructed by any self-adherable material, and the optical lens is configured to magnify mirror images viewed through the optical lens and the mirror.

10. The apparatus of claim 9, wherein the annular adhesive material comprises suction material configured to self-adhere to the mirror, the suction material being different from a material of which the optical lens is formed.

11. The apparatus of claim 9, wherein the optical lens is formed of at least one of optical grade plastic material, high refractive index material, high-plastic material, or polycarbonate material.

12. The apparatus of claim 9, wherein, when at least the outer annular portion of the conical concave surface is self-adhered to the mirror, at least the outer annular portion of the conical concave surface self-adheres flush to the mirror with an air gap located in between the mirror and the central portion of the conical concave surface.

13. The apparatus of claim 9, wherein the optical lens further comprises a beveled edge adjoining perimeters of the conical concave surface and the conical convex surface.

14. The apparatus of claim 9, wherein the first radius of curvature and the second radius of curvature are configured to yield an optical power for the optical lens in a range from 0.25 to 3 diopters.

15. The apparatus of claim 9, further comprising a frame positioned around a perimeter of the optical lens, the frame being formed of material different from a material of which the optical lens is formed.

16. The apparatus of claim 9, wherein the conical concave surface has a first conical constant and the conical convex surface has a second conical constant greater in magnitude than the first conical constant.

17. The optical lens of claim 1, wherein, when adhered, the outer annular portion contacts the mirror and a central air gap remains between the mirror and the central portion of the conical concave surface.

18. The optical lens of claim 1, wherein:
- the annular adhesive film comprises suction material affixed to the outer annular portion, and the suction material comprises micro suction materials.

19. The optical lens of claim 1, wherein the optical lens comprises at least one of:
- i. an edge of the optical lens being approximately 17 mm thick with a beveled edge having a bevel face width of approximately 25 mm,
- ii. a diameter of approximately 190 to 200 mm,
- iii. a shape corresponding with an approximately 8-inch by approximately 10-inch rectangle,
- iv. a shape corresponding with an approximately 10-inch round circle,
- v. a shape corresponding with an approximately 10-inch by approximately 9-inch oval, or
- vi. a shape corresponding with an approximately 10-inch square.

20. The optical lens of claim 1, wherein:

$$z(r) = \frac{cr^2}{1 + \sqrt{1 - (1 + k)c^2 r^2}},$$

- z(r) represents a z-component of a displacement of a surface from a vertex of the optical lens, at a radial distance r from an optical axis of the optical lens,
- c represents the curvature,
- r represents the radial distance in mm,
- k represents the conic constant, and
- the optical lens comprises at least one of:
- ii. for the diameter of 190 to 200 mm (r is approximately 95 to 100 mm) or the maximum radius of r is approximately 100 mm:
  - for the conical concave surface: z is approximately −22.70 mm, and
  - for the conical convex surface: z is approximately −21.76 mm,
- iii. for the approximately 8-inch by approximately 10-inch rectangle (rmax is approximately 162.6 mm), the maximum radial distance is at the corners (is approximately 162.6 mm):
  - for the conical concave surface: z is approximately −37.45 mm, and
  - for the conical convex surface: z is approximately −36.08 mm,
- iv. for the approximately 10-inch round circle (r is approximately 127 mm), for a radius of approximately 5 inches (is approximately 127 mm):
  - for the conical concave surface: z is approximately −29.06 mm, and
  - for the conical convex surface: z is approximately −27.93 mm,
- v. for the approximately 10-inch by approximately 9-inch oval (rmax is approximately 127 mm), at the major axis (r is approximately 127 mm), the displacement is identical to the approximately 10-inch circle:
  - for the conical concave surface: z is approximately −29.06 mm, and for the conical convex surface: z is approximately −27.93 mm, or vi. for the approximately 10-inch square (rmax is approximately 179.6 mm), the maximum radial distance is at the corners (is approximately 179.6 mm):

for the conical concave surface: z is approximately −41.46 mm, and for the conical convex surface: z is approximately −39.97 mm.

* * * * *